May 22, 1956  K. POLASEK ET AL  2,747,107
ALTERNATING CURRENT GENERATING ARRANGEMENT
FOR CONSTANT FREQUENCY
Filed Nov. 15, 1951

INVENTORS
KARL POLASEK,
KURT ALVAR JONSSON,
BY Larson & Whiting
ATTORNEYS

United States Patent Office 2,747,107
Patented May 22, 1956

2,747,107

ALTERNATING CURRENT GENERATING ARRANGEMENT FOR CONSTANT FREQUENCY

Karl Polasek, Trollbacken, and Kurt A. Jonsson, Stockholm, Sweden

Application November 15, 1951, Serial No. 256,542

3 Claims. (Cl. 307—43)

In the use of A. C. generators of ordinary construction the frequency is held constant by holding the generator speed constant.

It is an object of the present invention to permit the speed to vary appreciably and to keep the frequency and the voltage constant by means of a double frequency transformation. In the following description the application to a 3-phase arrangement will be shown.

Figure 1:
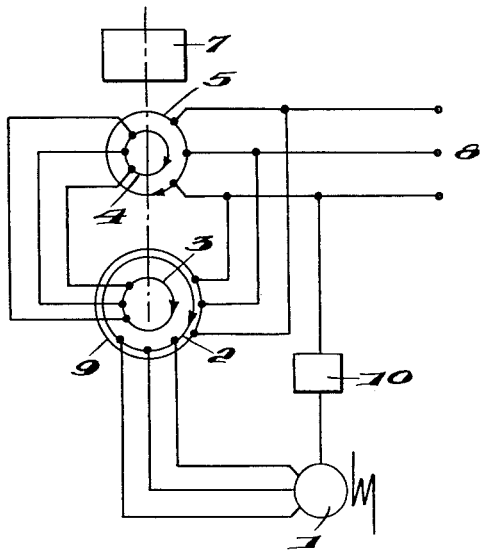
Figure 2:
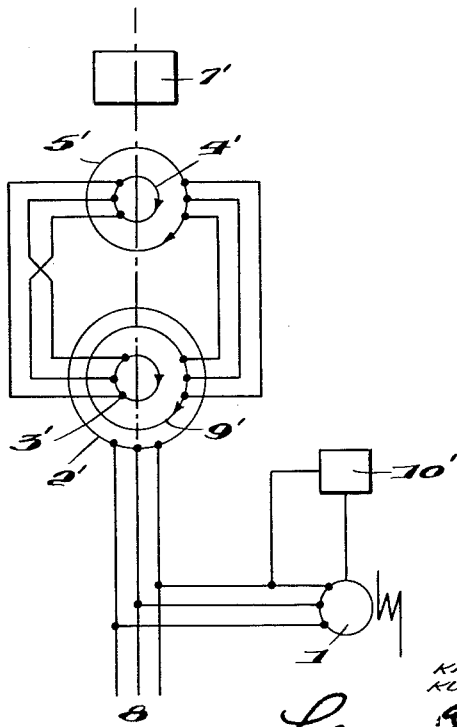

The invention will now be described with reference being made to the Figures 1 and 2, showing two embodiments thereof.

In Figure 1, 1 represents a small 3-phase generator for the required constant frequency. The generator 1 serves as a source and feeds the stator 2 of a 3-phase induction generator, the rotor of which has a winding 3 and is mounted on the shaft of a prime mover 7, representing a source of energy having a variable speed, such as an aircraft engine. On the same shaft there is mounted a rotor of a 3-phase induction generator having a winding 4. The stator 5 of the generator feeds electrical energy into the distributing network 8. The rotor 3 is connected to winding 4 with the same phase sequence. The stator 5 is coupled back to the winding 9 of the stator of the first induction generator.

Fig. 2 shows a similar arrangement, in which the load 8 is coupled to the winding 2, which is then dimensioned for the expected load.

Thus, the arrangement comprises the source 1', the first induction generator as a first engine having a primary 2', a secondary 3' and a back-coupling member 9'; 2' and the second induction generator as the second engine having a primary 4' and a secondary 5'. The function of the various units is as follows:

The source 1' feeds current of the desired frequency into the stator 2'. The rotor voltages thereby set up in winding 3' have a frequency being the difference of the source frequency and the frequency of revolution, the latter being proportional to the speed of the prime mover 7'. These voltages are applied to the winding 4' of the rotor of the second generator with like phase sequence. This means that there are induced in the stator winding 5' of the second generator voltages of a frequency equal to the rotor frequency in winding 4' plus the frequency of rotation, i. e. the desired frequency equal to the source frequency.

In this manner the frequency and the voltage are made independent of speed variations. The output voltage is approximately constant and only the output energy and current vary in approximate proportion to the speed.

A more accurate constancy of the voltage may be attained by inserting a voltage regulator 10' between the network 8' and the source 1'. However, the compounded back-coupling by means of the winding 9' is sufficient in most cases for keeping the voltage within normal limits.

The generator effect is obtained when the rotors 3' and 4' rotate above synchronous speed with regard to the revolving stator field of the first generator.

The dimensions and the angular position of the winding 9' relative to the winding 2' or the angular position of the stators or of the rotors relative to each other determine the operating range of the generator. The amount and phase of the back-coupling should preferably be selected so as to make the one engine work as an inductance, the other as a capacitance, the pacemaker being unloaded and serving only to determine the frequency and the voltage.

The source 1' need only be proportioned to supply its own losses. Since there are only fixed connections and no sliding contacts between the source and the two generators, the arrangement is very uncomplicated and dependable.

In a single-phase arrangement, two of the three phases shown are omitted.

In principle it would be possible to use the smallest possible number of phases, i. e. only one phase in the rotor windings 3' and 4', however, possibly existing asymmetries are cancelled most effectively if the same number of phases is used in the rotors and in the stators.

The arrangement described is well adapted for achieving a supply of A. C. energy of constant frequency by means of an engine of highly variable speed, such as an aircraft engine, where the highest and lowest speeds may be in the ratio of 4 to 1. No supply network of appreciable capacity is available, merely a pacemaker of constant frequency and voltage.

The invention comprises the use of a double frequency transformation. In the first generator the source frequency is decreased by the frequency of rotation, in the second generator the sum frequency obtained is increased again by an amount equal to the frequency of rotation. Thus the output can have no other frequency than that of the pacemaker.

The first and the second generator must have the same number of poles.

What is claimed is:

1. An arrangement for generating a constant frequency voltage and adapted to be connected to a variable speed prime mover comprising, two induction generators, means mechanically interconnecting the rotors of said generators, a source for feeding a constant frequency voltage to the stator of the first of said induction generators, means electrically interconnecting said rotors with the same phase sequence, and means for connecting said mechanical interconnecting means to said prime mover, the stator winding of said second generator being connected to a backfeed winding in the stator of said first generator, the stator of said first generator being adapted to deliver the output.

2. An arrangement for generating a constant frequency voltage and adapted to be connected to a variable speed prime mover comprising, two similar induction generators, means for mechanically connecting the rotors of said generators to said prime mover to be driven at the same R. P. M., a pacemaker for delivering voltage at a constant frequency, means connecting the output of said pacemaker to the stator of the first induction generator so that the output at the rotor of said first generator will be at a frequency equal to the difference between the pacemaker frequency and the frequency caused by the speed of rotation of the rotor, means connecting the output of said first generator to the rotor of the second generator so that the voltage induced in the stator of the second generator will be at a frequency equal to the frequency of the output of the first generator plus the frequency created by the speed of rotation of the rotor of the second generator.

3. An arrangement according to claim 2 in which the stator winding of said second generator is adapted to deliver the output and is connected to a backfeed winding in the stator of said first generator.

References Cited in the file of this patent

UNITED STATES PATENTS

| | | |
|---|---|---|
| 1,628,464 | Hobart | May 10, 1927 |
| 2,412,970 | Crary | Dec. 24, 1946 |
| 2,444,077 | Weathers | June 29, 1948 |

FOREIGN PATENTS

| | | |
|---|---|---|
| 471,113 | Great Britain | Aug. 23, 1937 |